US010237465B2

(12) United States Patent
Chan

(10) Patent No.: US 10,237,465 B2
(45) Date of Patent: Mar. 19, 2019

(54) CAMERA, METHOD, AND SYSTEM FOR FILMING GOLF GAME

(71) Applicant: Lak Wang Chan, HongKong (HK)

(72) Inventor: Lak Wang Chan, HongKong (HK)

(*) Notice: Subject to any disclaimer, the term of this patent is extended or adjusted under 35 U.S.C. 154(b) by 367 days.

(21) Appl. No.: 15/176,239

(22) Filed: Jun. 8, 2016

(65) Prior Publication Data
US 2016/0337573 A1 Nov. 17, 2016

Related U.S. Application Data

(63) Continuation of application No. PCT/CN2015/079085, filed on May 15, 2015.

(51) Int. Cl.
| | |
|---|---|
| *H04N 7/18* | (2006.01) |
| *H04N 9/47* | (2006.01) |
| *H04N 5/232* | (2006.01) |
| *G01S 19/19* | (2010.01) |
| *G09B 19/00* | (2006.01) |
| *H04N 5/77* | (2006.01) |

(52) U.S. Cl.
CPC ......... *H04N 5/23206* (2013.01); *G01S 19/19* (2013.01); *G09B 19/0038* (2013.01); *H04N 5/23216* (2013.01); *H04N 5/23222* (2013.01); *H04N 5/23293* (2013.01); *H04N 5/77* (2013.01); *H04N 7/188* (2013.01)

(58) Field of Classification Search
None
See application file for complete search history.

(56) References Cited

U.S. PATENT DOCUMENTS

| | | | |
|---|---|---|---|
| 2007/0021226 A1* | 1/2007 | Tyroler | A63B 71/06 473/131 |
| 2012/0249593 A1* | 10/2012 | Nakagome | G06T 7/254 345/634 |
| 2014/0185881 A1* | 7/2014 | Nakamura | G06T 7/223 382/107 |

* cited by examiner

*Primary Examiner* — Talha M Nawaz
(74) *Attorney, Agent, or Firm* — W&K IP

(57) ABSTRACT

The present disclosure provides a camera and a method for filming a golf game. The method comprises: recording the first direction, vertical angle, and horizontal angle of a camera when a desired hitting direction, a desired hitting distance, and a desired proportion of zoom are determined; recording the second direction, vertical angle, and horizontal angle of the camera when a golfer is detected; controlling a pan-tilt head to pan a camera module to the desired hitting direction according to the first and second direction, and the first and second horizontal and vertical angles, and the desired proportion of zoom once the ball is determined to be successfully hit, so as to film the golf game; and stopping filming when a flight duration of the ball corresponding to the desired hitting distance elapses. A system including the camera, a portable device, and a cloud server is also provided.

33 Claims, 15 Drawing Sheets

| Flight duration (second) | Range of hitting distance (yard) |
|---|---|
| 1 | 10~20 |
| 2 | 20~30 |
| 3 | 30~50 |
| 4 | 50~100 |
| 5 | 100~150 |
| 6 | 150~180 |
| 7 | 180~230 |
| 8 | 230~280 |
| 9 | 280~330 |

FIG. 4

| Range of hitting distance (yard) | Golf club |
|---|---|
| 1~10 | Sand 60 |
| 10~40 | Wedge 56 |
| 40~110 | P |
| 110~125 | iron9 |
| 125~140 | iron8 |
| 140~155 | iron7 |
| 155~165 | iron6 |
| 165~170 | Hybird5 |
| 170~190 | Hybird4 |
| 190~210 | wood3 |
| 210~250 | Driver |

CAMERA, METHOD, AND SYSTEM FOR FILMING GOLF GAME

CROSS-REFERENCE TO RELATED APPLICATIONS

This application is a continuation of International Patent Application No. PCT/CN2015/079085 with an international filing date of May 15, 2015, designating the United States, now pending. The contents of the aforementioned application, including any intervening amendments thereto, are incorporated herein by reference.

FIELD OF THE INVENTION

The present invention generally relates to cameras, and particularly, to a camera, a method, and a system for filming a golf game.

BACKGROUND

Videos taken during a golf game are good for entertainment as well as a tool to improve golfer's skill. Generally, a video of a golf game is taken by another person (generally not the golfer to play the golf game) using a camera or a smart device with a built-in camera to trace the ball. Golf balls generally fly at a high speed, and it is difficult by human visual detection to trace a ball from a hit until the ball lands. Therefore, it is desired to provide a camera which can automatically film golfer's swing and flying of a ball all the way until the ball lands.

SUMMARY OF THE INVENTION

An aspect of the present invention is to provide a camera for filming a golf game automatically. The camera includes a camera module for capturing images, a pan-tilt head pivotally connected to the camera module and capable of rotating the camera module horizontally and vertically, a sensor unit to sense direction, vertical angle, and horizontal angle of the camera, a GPS module to provide GPS data of golf courses worldwide; and a central processing unit connected to the camera module, the pan-tilt head, the sensor unit, and the GPS module. Wherein, the central processing unit is configured to: record the first direction, first vertical angle, and first horizontal angle of the camera when a desired hitting direction, a desired hitting distance, and a desired proportion of zoom are determined; record the second direction, second vertical angle, and second horizontal angle of the camera when a golfer is detected; determine whether or not a ball has been successfully hit by the golfer; control the pan-tilt head to pan the camera module to the desired hitting direction according to the first and second direction, first and second horizontal angles, and first and second vertical angles of the camera, and the desired proportion of zoom once the ball is determined to be successfully hit by the golfer, so as to film the golf game; and stop filming when a flight duration of the ball corresponding to the desired hitting distance elapses; whereby the golf game is filmed without tracing the ball.

Another aspect of the present invention is to provide a method for filming a golf game automatically. The method includes: recording the first direction, first vertical angle, and first horizontal angle of the camera when a desired hitting direction, a desired hitting distance, and a desired proportion of zoom are determined; recording the second direction, second vertical angle, and second horizontal angle of the camera when a golfer is detected; determining whether or not a ball has been successfully hit by the golfer; controlling the pan-tilt head to pan the camera module to the desired hitting direction according to the first and second direction, first and second horizontal angles, and first and second vertical angles of the camera, and the desired proportion of zoom once the ball is determined to be successfully hit by the golfer, so as to film the golf game; and stopping filming when a flight duration of the ball corresponding to the desired hitting distance elapses; whereby the golf game is filmed without tracing the ball.

Another aspect of the present invention is to provide a system including a camera, a portable device, and a cloud server. The camera includes a camera module for capturing images, a pan-tilt head pivotally connected to the camera module and capable of rotating the camera module horizontally and vertically, a first wireless communication module, a sensor unit to sense direction, vertical angle, and horizontal angle of the camera, a GPS module to provide GPS data of golf courses worldwide; and a first central processing unit connected to the camera module and the pan-tilt head. Wherein, the first central processing unit is configured to: record the first direction, first vertical angle, and first horizontal angle of the camera when a desired hitting direction, a desired hitting distance, and a desired proportion of zoom are determined; record the second direction, second vertical angle, and second horizontal angle of the camera when a golfer is detected; determine whether or not a ball has been successfully hit by the golfer; control the pan-tilt head to pan the camera module to the desired hitting direction according to the first and second direction, first and second horizontal angles, and first and second vertical angles of the camera, and the desired proportion of zoom once the ball is determined to be successfully hit by the golfer, so as to film the golf game; stop filming when a flight duration of the ball corresponding to the desired hitting distance elapses; whereby the golf game is filmed without tracing the ball; and transmit the recorded video to the portable device. The portable device includes a second wireless communication unit to communicate the portable device with the camera, a first network module to communicate the portable device with a cloud server, and a second central processing unit connected to the second wireless communication unit and the first network module, and configured to transmit the recorded videos from the camera to the cloud server. The cloud server includes a second network module to communicate the cloud server with the portable device, and a third central processing unit connected to the second network module and configured to process the recorded videos from the portable device.

Other aspects of the present invention are disclosed as illustrated by the embodiments hereinafter.

BRIEF DESCRIPTION OF THE DRAWINGS

The features and advantages of the present invention will be apparent from the following detailed description of the invention with reference to the accompanied drawings in which:

FIG. 4 shows a table recording relationships between flight duration of a ball and ranges of hitting distance, in accordance with an exemplary embodiment of the present invention;

FIG. 15 shows a table recording relationships between ranges of hitting distance, and golf clubs used by the golfer, in accordance with an exemplary embodiment of the present invention.

DETAILED DESCRIPTION

Figure 1:
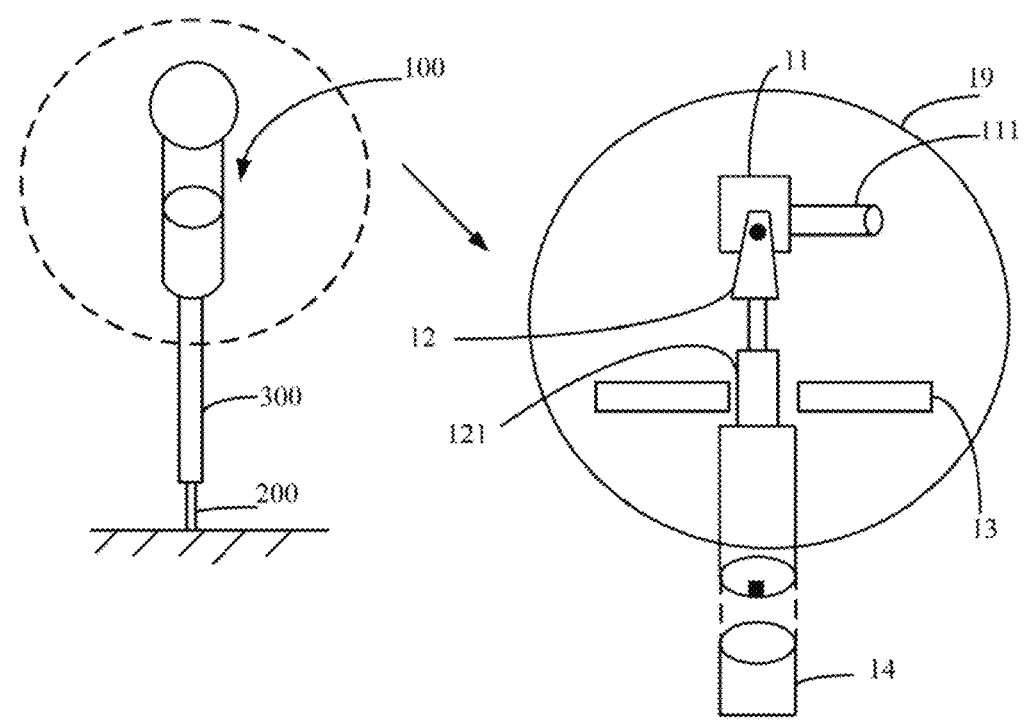
FIG. 1 shows the structure of a camera for filming a golf game, in accordance with an embodiment of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and proportions of certain parts may be exaggerated to better illustrate details and features. The description is not to be considered as limiting the scope of the embodiments described herein.

Only one definition that applies throughout this disclosure will now be presented.

The term "comprising" means "including", but not necessarily limited to, it specifically indicates open-ended inclusion or membership in a so-described combination, group, series, and the like.

Embodiments of the present disclosure will be described with reference to the accompanying the drawings.

Referring to FIG. 1, a camera 100 for filming a golf game is illustrated. A pin 200 and a pole 300 are employed for inserting the camera 100 on the ground. The camera 100 includes a camera module 11, a pan-tilt head 12, a circuit board 13, and a power module 14. The camera module 11 includes a zoom lens 111. The pan-tilt head 12 is pivotally connected to the camera module 11, and can rotate the camera module 11 horizontally and vertically due to the actuation of motors 121 of the pan-tilt head 12. The motors 121 may be servo motors. The power module 14 provides power to the camera 100. The power module 14 may be one or more batteries. The camera module 11 and the pan-tilt head 12 are electrically connected to and controlled by the circuit board 13. The camera 100 may further include a transparent cover 19 to cover and protect the camera 100. The transparent cover 19 may be plastic, and may be circular or cylindrical.

Figure 2:
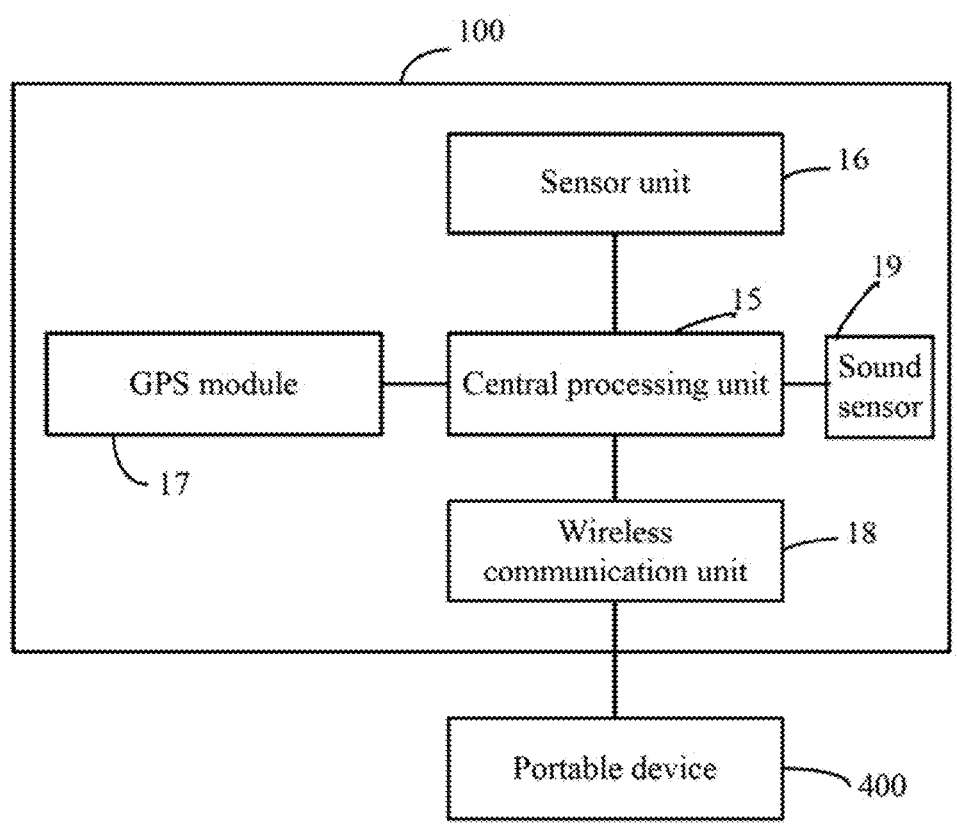
FIG. 2 is schematic block diagram of a camera for filming a golf game, in accordance with an embodiment of the present invention.

Referring to FIG. 2, the camera 100 further includes a central processing unit 15, a sensor unit 16, a GPS module 17, and a wireless communication unit 18 arranged on the circuit board 13. The sensor unit 16 senses direction, horizontal angle, and vertical angle of the camera 100. The sensor unit 16 may be a gyroscope. The GPS module 17 provides GPS information of golf courses worldwide. The wireless communication unit 18 may communicate the camera 100 with a portable device 400 of a golfer. The wireless communication unit 18 may be a WIFI module or a Bluetooth module. The portable device 400 may be a smart phone or a tablet PC. The central processing unit 15 controls the operation of the camera 100, for example, controls the pan-tilt head 12 to pan the camera 100 to a desired hitting direction so as to film the golf game with a preset proportion of zoom, and controls the communication between the camera 100 and the portable device 400.

Figure 3:
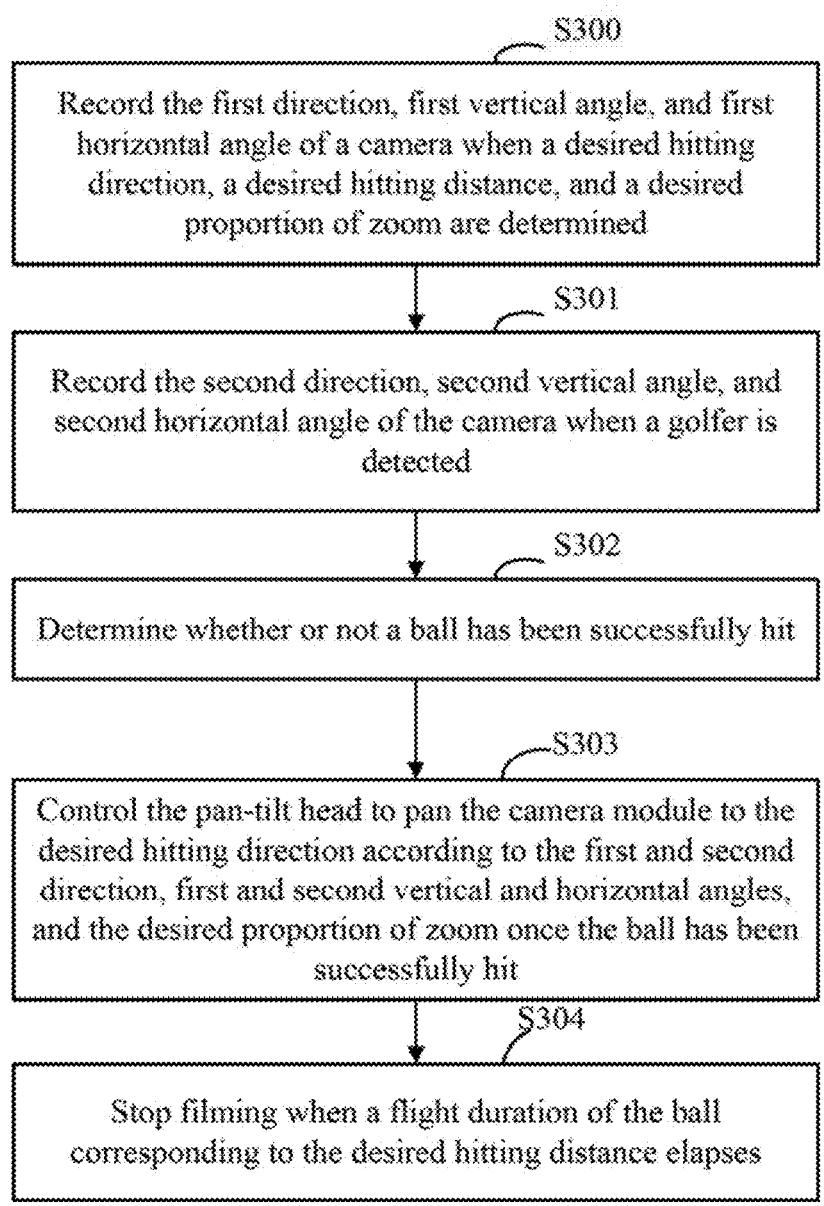
FIG. 3 is a flow chart of a method for filming a golf game, in accordance with an embodiment of the present invention.

FIG. 3 illustrates a method for filming a golf game, in accordance with an exemplary embodiment of the present invention. In step S300, the first direction, first horizontal angle, and vertical angle of the camera 100 are recorded when the desired hitting direction, the desired hitting distance, and the desired proportion of zoom are determined. In step S301, the second direction, second vertical angle, and horizontal angle of the camera 100 are recorded when a golfer is detected by the camera 100. In step S302, whether or not a ball has been successfully hit by the golfer is determined. In step S303, the pan-tilt head 12 is controlled to pan the camera module 11 to the desired hitting direction according to the first and second direction, first and second horizontal angles, and first and second vertical angles of the camera 100, and the desired proportion of zoom once the ball is determined to be successfully hit by the golfer, so as to film the golf game. The proportion of zoom is related to the desired hitting distance. For example, if the desired hitting distance is 180 yards, and the proportion of zoom is 50%, it means that the zoom lens 111 will zoom to 90 yards. When the camera 100 is delivered, a proportion of zoom exists in the camera 100, and users can reset the proportion of zoom. In step S304, filming stops when a flight duration of the ball corresponding to the desired hitting distance elapses. In this embodiment, the camera 100 stores relationships (see FIG. 4) recording flight duration of the ball and ranges of hitting distances. Each range of hitting distance corresponds to one flight duration. For example, if the range of hitting distance is from 150 yards to 180 yards, the flight duration of the ball may be 6 seconds. That is, if the hitting distance entered by the golfer or determined by the camera 100 is 160 yards, the flight duration of the ball may be 6 seconds. The relationships are obtained according to the golfer's experience.

Figure 5:
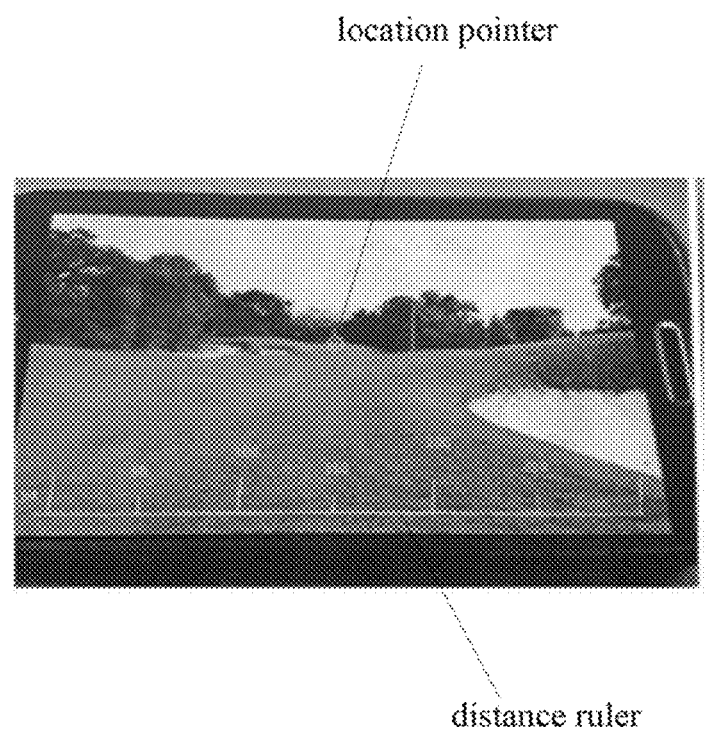
FIG. 5 shows a touch screen of a portable device operated with the camera of FIG. 1, in accordance with an exemplary embodiment of the present invention, with a location pointer displayed to set a target landing point, and a distance ruler displayed to set a desired hitting distance.
Figure 6:
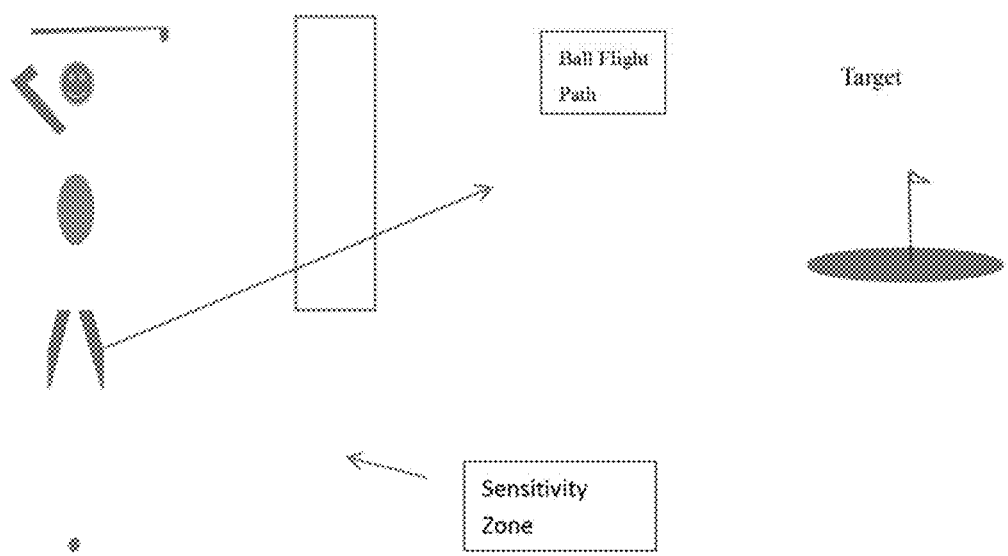
FIGS. 6-7 are schematic views showing how to define a sensitivity zone, in accordance with an exemplary embodiment of the present invention.
Figure 7:
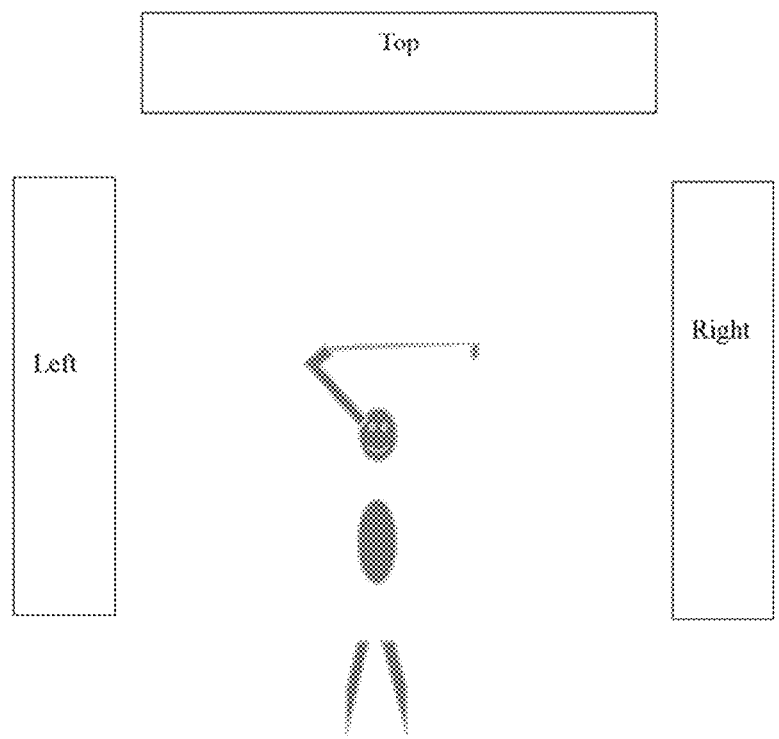

The following description is used to describe how to determine the desired hitting direction, the desired hitting distance, and the desired proportion of zoom in a manual mode of the camera 100. The camera 100 is firstly inserted on the ground facing the direction the golfer intends to hit towards. The golfer then stands on the ground near the camera 100 and operates the portable device 400 to establish communication between the camera 100 and the portable device 400 via wireless communication. After communication is established, the camera 100 may transmit selection information to ask the golfer to select the mode of the camera 100 from the manual mode and a GPS mode. If the manual mode is selected, the camera 100 enters the manual mode, controls the displayed image of the camera 100 to be synchronized with the displayed image of the portable device 400, and determines the desired hitting direction, the desired hitting distance, and the desired proportion of zoom according to golfer's input through the portable device 400. In this embodiment, the image displayed on the portable device 400 can be synchronized with the image displayed on the camera 100, and the camera 100 can rotate horizontally and vertically according to variation of the image displayed on the portable device 400. As shown in FIG. 5, when entering the manual mode, the camera 100 captures an image, and the captured image is synchronizely displayed on the portable device 400. The camera 100 then transmits an information to the portable device 400 to ask the golfer to enter the desired hitting distance. The golfer can enter the desired hitting distance according to a preset distance ruler. When receiving the desired hitting distance, the camera 100 zooms in or zooms out the displayed image with the preset proportion of zoom, and a location pointer is used to point the target landing point. If the golfer wants to change the target landing point, the golfer can touch the touch screen of the portable device 400 to move the location pointer up, down, left or right. Furthermore, the golfer can sweep the touch screen of the portable device 400 to adjust the proportion of zoom. Upon confirmation of the desired hitting distance, the desired landing point, and the desired proportion of zoom, the first direction, first vertical angle, and first horizontal angle of the camera 100 are recorded. After that, the camera 100 rotates to find the golfer, and records the second direction, second vertical angle, and second horizontal angle of the camera 100 when the golfer is detected by the camera 100, and a prompt signal will be transmitted to the portable device 400 communicating with the camera 100 to inform the golfer that it is time to hit the ball. See FIGS. 6-7, the camera 100 may further define an area between the golfer and the desired landing point is a sensitivity zone. For example, if the golfer is at the left of the target landing point, the camera 100 determines that the sensitivity zone is at the left of the golfer. Generally, the sensitivity zone is near the golfer, and the ball flies through the sensitivity zone at higher velocity.

Figure 8:
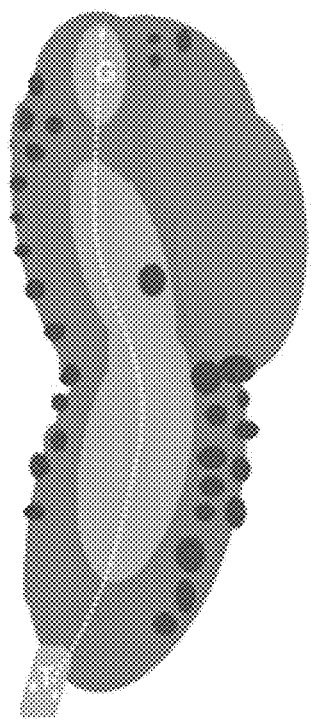
FIG. 8 is a schematic view showing a golf course including the center line of fairway recorded in GPS data, in accordance with an exemplary embodiment of the present invention.

If the GPS mode option is selected by the golfer or the camera 100 does not receive any feedback from the portable device 400 after the selection information is displayed on the portable device 400 for a period, the camera 100 enters the GPS mode. In the GPS mode, GPS data from the GPS module 17 are employed to determine the desired hitting direction and/or the desired hitting distance. In detail, there is a cloud-based service providing updated GPS database of golf courses worldwide, and the updated GPS database will be synchronized to the camera 100. As shown in FIG. 8, the GPS data for a designated golf course may include GPS coordinates of every tee off area (represented by T), the center of green (represented by G), and the center line of the fairway (represented by the dotted line). This center line represents theoretical best landing locations.

Figure 9:
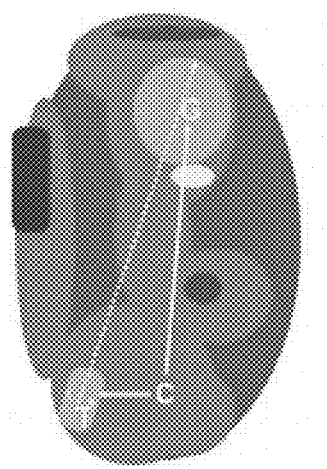
FIG. 9 is a schematic view showing a Par 3 hole, in accordance with an exemplary embodiment of the present invention.

As shown in FIG. 9, if the hole type is Par 3, the camera 100 automatically determines the desired hitting direction and distance according to GPS data of the current location of the camera 100 and the center of the green G. In detail, when the golfer inserts the camera 100 on the location C near the tee off area T and facing the green G, the camera 100 obtains the position information of the camera 100, searches GPS data to find which golf course the golfer selects according to the position information of the camera 100, and determines the hole type of the selected golf course. If the hole type is Par 3, the camera 100 immediately simulates and reviews the final view of ball landing for the golfer to confirm. If change is not required, the camera 100 determines the desired hitting direction and distance according to GPS data of the current location of the camera 100 and the center of the green G. If change is required, the camera 100 enters the manual mode, and determines the desired hitting direction and distance as described in the manual mode.

Figure 10:
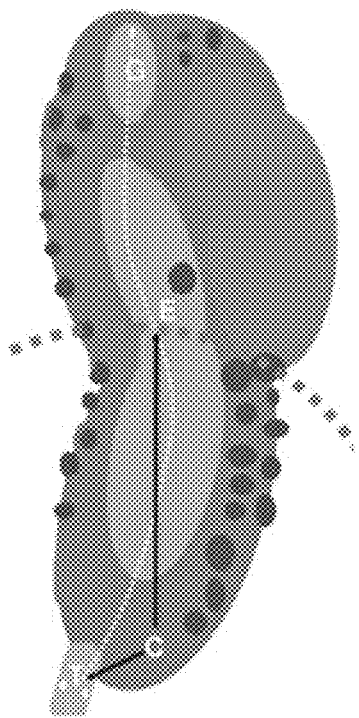
FIG. 10 is a schematic view showing a Par 4 or Par 5 hole with a landing point E, in accordance with an exemplary embodiment of the present invention.

As shown in FIG. 10, if the camera 100 determines that the hole type is Par 4 or Par 5, for the first shot, the camera 100 transmits an information to the portable device 400 to ask the golfer to enter a desired hitting distance. When receiving the desired hitting distance from the portable device 400, the camera 100 draws a circle with the location C the camera 100 stands on as the center and with the desired hitting distance as the radius, and determines an intersection point E between the circle and the center line of fairway of the selected golf course is the landing point E, and immediately simulates and reviews the final view of ball landing for the golfer to confirm. If change is not required, the camera 100 determines the desired hitting direction according to GPS data of the tee off area T and the landing point E. If change is required, the camera 100 enters the manual mode, and determines the desired hitting direction and distance as described in the manual mode.

After the first shot, the ball will normally land on the center line of fairway or a position near the landing point E. If the golfer wants to play the second shot, the golfer will inserts the camera on a position near the ball and facing the direction the golfer wants to hit. The desired hitting distance is then required to be entered, and a second landing point is subsequently determined as the determination of the first landing point. After the second landing point is determined, the camera 100 immediately simulates and reviews the final view of ball landing for the golfer to confirm. If change is not required, the camera 100 determines the desired hitting direction according to the GPS data of the current location of the camera 100 and the second landing point. If change is required, the camera 100 enters the manual mode, and the desired hitting direction is determined as described in the manual mode. All subsequent shots will be finished similar to the first shot and the second shot until the ball lands on the green.

It is noteworthy that in the GPS mode, hit records of every hit of each selected golf course will be saved into a database file. The hit records may include the desired hitting direction, the desired hitting distance, the desired proportion of zoom, and so on. The camera 100 checks whether or not a history record exists when playing each hit, and prompts the golfer to whether or not to use the history record if the history record exists.

Furthermore, the camera 100 prompts the golfer whether or not to use the history record of a previous hitting location as the current setting of the current hitting location if the distance between the previous hitting location and the current hitting location is less than or equal to a preset value, e.g., 5 yards. The preset value may be preset by the golfer.

It is noteworthy the camera 100 may enter a putting mode when the camera 100 is inserted near the green G. In the manual mode, the camera 100 enters the putting mode in response to user's selection. In the GPS mode, when the camera 100 is inserted near the green G, the camera 100 will automatically prompt the golfer to select the putting mode. After entering the putting mode, the camera 100 detects whether or not a golfer is present, and a vibration signal is sent to the portable device 400 to confirm ready when the golfer is determined to be present. In the putting mode, the camera 100 will trace and film the ball movement from it is put and moves until it stops using known vision-based object tracking algorithm.

Figure 11:
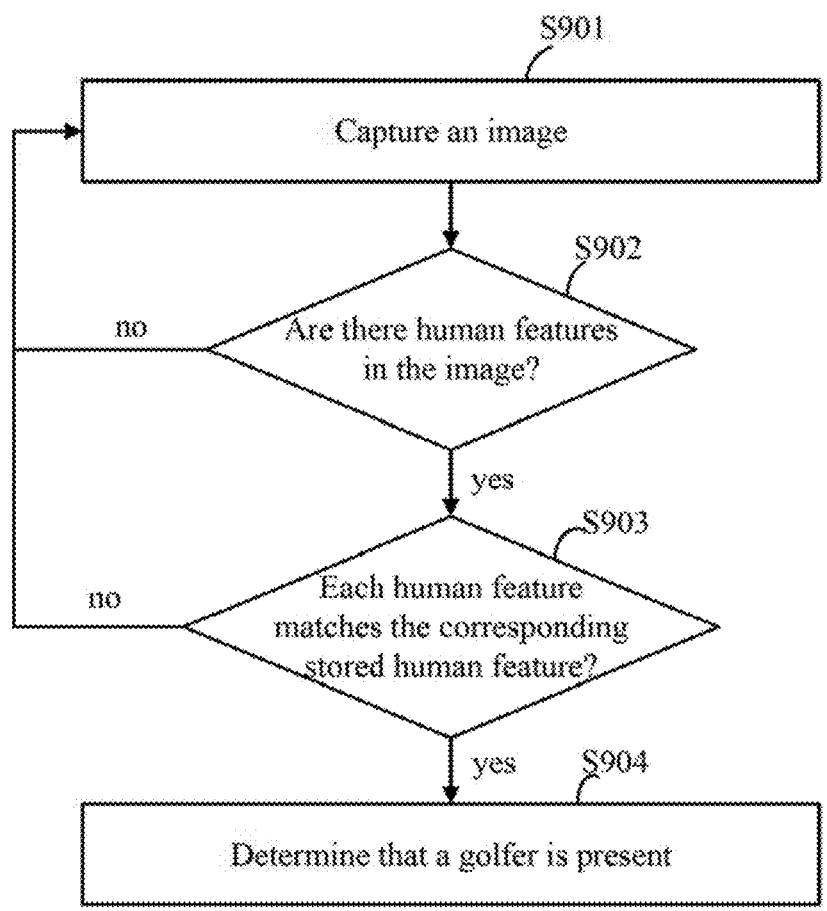
FIG. 11 is a flow chart of a method for determining whether or not a golfer is present, in accordance with an exemplary embodiment of the present invention.

FIG. 11 is a method for determining whether or not the golfer is present, in accordance with an exemplary embodiment. In step S901, an image is captured. In step S902, whether or not human features can be extracted from the captured image is determined. If there are human features, the procedure goes to step S903, otherwise step S901 is repeated. In step S903, whether or not each extracted human feature matches the corresponding stored human feature is determined. If each extracted human feature matches the corresponding stored human feature, the procedure goes to step S904, otherwise step S901 is repeated. In step S904, the golfer is determined to be present. In this embodiment, each golfer will be asked to take a photo of his face or body before playing, which will be saved into the camera 100. Then a known algorithm for face recognition or human recognition can be used to detect whether or not a golfer is present. In this embodiment, after the golfer is detected, the camera 100 will lock the golfer on a screen of the camera 100 according to personal setup, for example, the proportion of the height of the golfer comparing to the height of the screen of the camera 100, and the location of the golfer in the video.

When the golfer is detected, the camera 100 transmits a prompt signal, such as a vibration signal for example, to the portable device 400. When the prompt signal is received by the portable device 400, the golfer carrying the portable device 400 may know that it is time to put the ball.

Figure 12:
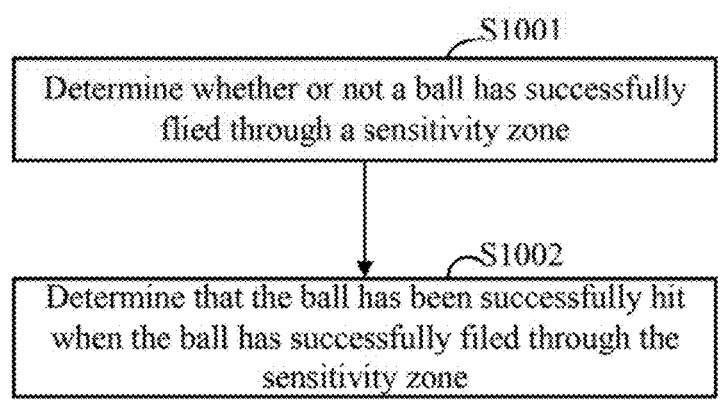
FIG. 12 is a flow chart of a method for determining whether or not a ball has successfully flied through a sensitivity zone, in accordance with an exemplary embodiment of the present invention.

FIG. 12 shows an embodiment of determining whether or not a ball has successfully flied through the preset sensitivity zone. In step S1001, a number of sequentially captured images are analyzed to determine whether or not a ball has successfully flied through the preset sensitivity zone. The camera 100 uses known image analysis to analyze a number of sequentially captured images, which will not be described in detail herein so as not to obscure the present disclosure. In step S1002, a ball is determined to be successfully hit by the golfer when the ball has successfully flied through the sensitivity zone. In this embodiment, a high-speed camera (frame rate 60-200 fps) may be used to detect flying of the ball after hitting.

Figure 13:
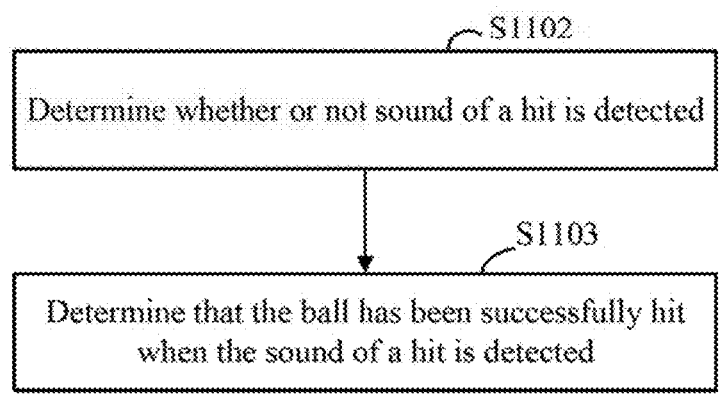
FIG. 13 is a flow chart of a method for determining whether or not a ball has been successfully hit by sound detection, in accordance with an exemplary embodiment of the present invention.

FIG. 13 shows an embodiment of determining whether or not a ball is successfully hit by the golfer by sound detection. In step S1102, sounds collected by the camera 100 are analyzed to determine whether or not sound of a hit is detected. The camera 100 may include a sound sensor 19, such as a microphone for example, to collect sounds. The camera 100 uses known spectrum analysis to determine whether or not the sound of a hit is detected, which will not be described in detail herein so as not to obscure the present disclosure. In step S1103, a ball is determined to be successfully hit by the golfer when the sound of a hit is detected.

In this embodiment, when the ball has been successfully hit by the golfer, the camera 100 will automatically pan to the desired hitting direction to film the golf game. Therefore, with such configuration, the golfer can easily get the videos of his golf games without others help.

Furthermore, in this embodiment, before stopping filming the golf game, the camera 100 will rotate backward to find the golfer and film his/her facial expression for a few seconds.

Furthermore, in this embodiment, after stopping filming the golf game, the camera 100 automatically enters a sleep mode to save power.

Furthermore, in this embodiment, after stopping filming the golf game, the camera 100 transmits the video of the golf game to the portable device 400 automatically or in response to golfer's operation on the camera 100. It is noteworthy that if the GPS data is employed, the video may have GPS meta information, which will help users to search, sort, categorize, and group videos by different criteria.

Figure 14:
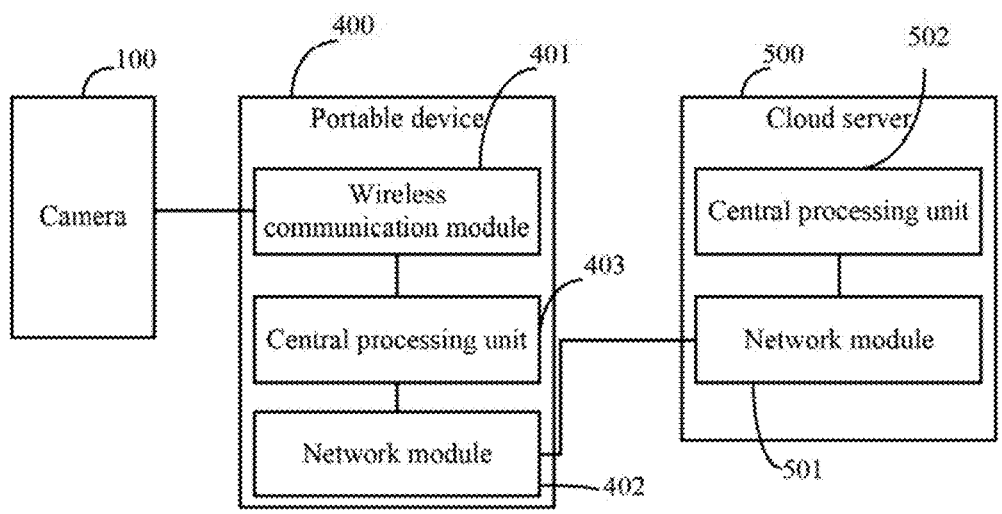
FIG. 14 is a block diagram of a system including the camera, the portable, and a cloud server, in accordance with an exemplary embodiment of the present invention.

Referring to FIG. 14, a system including the camera 100, the portable device 400, and a cloud server 500 is provided. The functions of the camera 100 and the portable device 400 which have been described above will not be repeated herein. The portable device 400 includes a wireless communication module 401 to communicate the portable device 400 with the camera 100, and a network module 402 to communicate the portable device 400 with the cloud server 500. The network module 402 may be a 3G or 4G communication module. The portable device 400 further includes a central processing unit 403 to perform functions of the portable device 400. In this embodiment, the central processing unit 403 can transmit commands to start the camera 100 in response to the golfer's operation on the portable device 400, controls the displayed image of the portable device 400 to be synchronized with the displayed image of the camera 100, and processes the recorded videos from the camera 100 and further transmits recorded videos from the camera 100 to the cloud server 500.

The central processing unit 403 may merge a number of videos into one video according to a preset rule, for example, the videos of the same golfer or the videos of the same golf course are merged into one video. The central processing unit 403 may further sort the videos according to a preset rule, for example, the videos of the same golfer are stored in a same file folder. The central processing unit 403 may further sort the videos according to the golf clubs used by the golfer, and determine the golf clubs used by the golfer according to relationships between ranges of hitting distance and golf clubs used by the golfer (see FIG. 15). The relationships are preset according to the golfer's preference. For example, if the hitting distance falls within 140-155 yards, the golfer may have used the golf club of iron 7.

It is noteworthy that the central processing unit 403 may sequentially replay hit records of 18 holes of a same golfer hit by hit according to the actual sequence of the actual play for 18 holes. The replay can show golfer's actual hit because the next record is the actual ball landing location of the previous hit, and it will show his target line of hit in compare to his actual hit. The central processing unit 403 is further configured to replay each hit record of a golfer to show the golfer's actual and intended direction of hit for the golfer to make a comparison. Almost all golfer's shot have derivation from his intended direction. It is very valuable for a golfer to see his actual and intended direction of hit.

The cloud server 500 may include a network module 501 to communicate the cloud server 500 with the portable device 400. The network module 501 may be Internet or Ethernet. The cloud server 500 may further include a central processing unit 502 to perform functions of the cloud server 500. In this embodiment, the central processing unit 502 can further process the videos from the portable device 400. The central processing unit 502 may analyze the videos of the same golfer to give a comment on the skills of the golfer, and transmit the comment to the portable device 400 of the golfer for improving the skills of the golfer. The central processing unit 502 may further provide a market place for a golfer to choose a golf coach to comment his/her skills, and the golfer may pay for the golf coach.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

I claim:

1. A camera for filming a golf game, comprising:
   a camera module for capturing images;
   a pan-tilt head pivotally connected to the camera module and capable of rotating the camera module horizontally and vertically;
   a sensor unit to sense the direction, vertical angle, and horizontal angle of the camera;
   a GPS module to provide GPS data of golf courses worldwide; and
   a central processing unit connected to the camera module, the pan-tilt head, the sensor unit, and the GPS module;
   wherein, the central processing unit is configured to:
   record the first direction, first vertical angle and first horizontal angle of the camera when a desired hitting direction, a desired hitting distance, and a desired proportion of zoom are determined;
   record the second direction, second vertical angle, and second horizontal angle of the camera when a golfer is detected;
   determine whether or not a ball has been successfully hit by the golfer;
   control the pan-tilt head to pan the camera module to the desired hitting direction according to the first and second direction, the first and second horizontal angles, and the first and second vertical angles of the camera, and the desired proportion of zoom once the ball is determined to be successfully hit by the golfer, so as to film the golf game; and
   stop filming when a flight duration of the ball corresponding to the desired hitting distance elapses;
   whereby the golf game is filmed without tracing the ball.

2. The camera of claim 1, wherein the central processing unit is configured to determine whether or not a ball has been successfully hit by the golfer by determining whether or not the ball has flied through a sensitivity zone, an area between the golfer and a target landing point is defined as the sensitivity zone.

3. The camera of claim 1, wherein the central processing unit is configured to determine whether or not a ball has been successfully hit by the golfer by determining whether or not the sound collected by the camera comprises sound of a hit.

4. The camera of claim 1, wherein the central processing unit is further configured to transmit a prompt signal to a portable device communicating with the camera when the golfer is detected, to inform the golfer that it is time to hit the ball.

5. The camera of claim 1, wherein the central processing unit is further configured to transmit selection information to a portable device communicating with the camera for the golfer to select the mode of the camera from a manual mode and a GPS mode.

6. The camera of claim 5, wherein the central processing unit is further configured to control the camera to enter the manual mode when the manual mode option is selected by the golfer through the portable device, control the displayed image of the camera to be synchronized with the displayed image of the portable device, and determine the desired hitting direction, the desired hitting distance, and the desired proportion of zoom according to golfer's input through the portable device, wherein the desired hitting distance is entered by the golfer according to a distance ruler, and the desired hitting direction, the horizontal angle and the vertical angle of the camera are adjusted according to movement of a location pointer displayed on the portable device, and the desired proportion of zoom is adjusted by sweeping a touch screen of the portable device.

7. The camera of claim 5, wherein the central processing unit is further configured to control the camera to enter the GPS mode when the GPS mode option is selected by the golfer through the portable device or when the camera does not receive any feedback from the portable device after the selection information is displayed on the portable device for a period, and determine the desired hitting direction and/or the desired hitting distance according to GPS data from the GPS module.

8. The camera of claim 7, wherein the central processing unit is configured to determine the desired hitting direction and the desired hitting distance according to GPS data of the current location of the camera and the center of the green of the currently selected golf course when the hole type of the currently selected golf course is Par 3.

9. The camera of claim 7, wherein the central processing unit is configured to transmit an information to the portable device to ask the golfer to enter the first desired hitting distance for the first shot when the hole type of the currently selected golf course is Par 4 or Par 5, immediately simulate and review the final view of ball landing once the first desired hitting distance is entered, and draw a circle with the location the camera stands on as the center and with the first desired hitting distance as the radius, determine an intersection point between the circle and the center line of fairway of the currently selected golf course is the landing point, determine the desired hitting direction of the first shot according to GPS data of the tee off area of the currently selected golf course and the landing point.

10. The camera of claim 9, wherein the central processing unit is further configured to transmit an information to the portable device to ask the golfer to enter the second desired hitting distance for a subsequent shot, immediately simulate and review the final view of ball landing once the second desired hitting distance is entered, and draw a circle with the location the camera stands on as the center and with the second desired hitting distance as the radius, determine a second intersection point between the circle and the center line of fairway of the currently selected golf course is the second landing point, and determine the desired hitting direction of the subsequent shot according to GPS data of the current location of the camera and the second landing point.

11. The camera of claim 7, wherein the central processing unit is further configured to record hit records of every hit of each selected golf course, check whether or not a history record exists when playing each hit, and prompt the golfer to whether or not to use the history record if the history record exists.

12. The camera of claim 11, wherein the central processing unit is further configured to prompt the golfer whether or not to use the history record of a previous hitting location as the current setting of the current hitting location if the distance between the previous hitting location and the current hitting location is less than or equal to a preset distance.

13. The camera of claim 1, wherein the central processing unit is further configured to control the camera to enter a putting mode in response to user's selection or automatically when the camera is inserted on a position near the green of the currently selected golf course, and control the camera module to film the movement of the ball from it is put and moves until it stops.

14. The camera of claim 1 further storing a relationship between flight duration and ranges of hitting distance, wherein each flight duration corresponds to one range of hitting distance.

15. The camera of claim 1, wherein the central processing unit is further configured to transmit the recorded video to a portable device communicating with the camera automatically or in response to golfer's operation on the camera after filming stops.

16. The camera of claim 1, wherein the central processing unit is further configured to control the pan-tilt head to drive the camera module to rotate backward to find the golfer and film the golfer's facial expression when the preset time period elapses.

17. The camera of claim 1, wherein the central processing unit is further configured to direct the camera to enter a sleep mode after filming stops.

18. The camera of claim 1 further comprising a transparent cover, wherein the transparent cover is to cover and protect the camera.

19. A method for filming a golf game applied in a camera, the camera comprising a camera module for capturing images, a pan-tilt head pivotally connected to the camera module and capable of rotating the camera module horizontally and vertically, a sensor unit to sense the direction, vertical angle, and horizontal angle of the camera, and a GPS module to provide GPS data of golf courses worldwide; the method comprising:
  recording the first direction, first vertical angle, and first horizontal angle of the camera when a desired hitting direction, a desired hitting distance, and a desired proportion of zoom are determined;
  recording the second direction, second vertical angle, and second horizontal angle of the camera when a golfer is detected;
  determining whether or not a ball has been successfully hit by the golfer;
  controlling, the pan-tilt head to pan the camera module to the desired hitting direction according to the first and second direction, first and second horizontal angles, and first and second vertical angles of the camera, and the desired proportion of zoom once the ball is determined to be successfully hit by the golfer, so as to film the golf game; and
  stopping filming when a flight duration of the ball corresponding to the desired hitting distance elapses,
  whereby the golf game is filmed without tracing the ball.

20. The method of claim 19, wherein determining whether or not a ball has been successfully hit by the golfer is by determining whether or not the ball has flied through a sensitivity zone, an area between the golfer and a target landing point is defined as the sensitivity zone.

21. The method of claim 19, wherein determining whether or not a ball has been successfully hit by the golfer is by determining whether or not the sound collected by the camera comprises sound of a hit.

22. The method of claim 19, further comprises:
  transmitting a prompt signal to a portable device communicating with the camera when the golfer is detected, to inform the golfer that it is time to hit the ball.

23. The method of claim 19, further comprises:
  transmitting selection information to a portable device communicating with the camera for the golfer to select the mode of the camera from a manual mode and an GPS mode.

24. The method of claim 23, further comprising:
  controlling the camera to enter the manual mode when the manual mode option is selected by the golfer through the portable device;
  controlling the displayed image of the camera to be synchronized with the displayed image of the portable device; and
  determining the desired hitting direction, the desired hitting distance, and the desired proportion of zoom according to golfer's input through the portable device, wherein the desired hitting distance is entered by the golfer according to a distance ruler, and the desired hitting direction, the horizontal angle and the vertical angle of the camera are adjusted according to movement of a location pointer displayed on the portable device, and the desired proportion of zoom is adjusted by sweeping a touch screen of the portable device.

25. The method of claim 23, further comprising:
  controlling the camera to enter the GPS mode when the GPS mode option is selected by the golfer through the portable device or when the camera does not receive any feedback from the portable device after the selection information is displayed on the portable device for a period, and
  determining the desired hitting direction and/or the desired hitting distance according to GPS data from the GPS module of the camera, wherein the GPS data comprises GPS data of golf courses worldwide.

26. The method of claim 25, wherein the step of determining the desired hitting direction and/or the desired hitting distance according to GPS data from a GPS module of the camera comprises:
  determining the desired hitting direction and the desired hitting distance according to GPS data of the current location of the camera and the center of the green, of the currently selected golf course when the hole type of the currently selected golf course is Par 3.

27. The method of claim 25, wherein the step of determining the desired hitting direction and/or the desired hitting distance according to GPS data from a GPS module of the camera comprises:
  transmitting an information to the portable device to ask the golfer to enter the first desired hitting distance for the first shot when the hole type is Par 4 or Par 5, immediately simulating and reviewing the final view of ball landing once the first desired hitting distance is entered, and drawing a circle with the location the camera stands on as the center and with the first desired hitting distance as the radius, determining an intersection point between the circle and the center line of fairway of the currently selected golf course is the first landing point, and determining the desired hitting direction according to GPS data of the tee off area of the currently selected golf course and the landing point.

28. The method of claim 27, wherein the step of determining the desired hitting direction and/or the desired hitting distance according to GPS data from a GPS module of the camera further comprises:

transmitting an information to the portable device to ask the golfer to enter the second desired hitting distance for a subsequent shot, immediately simulating and reviewing the final view of ball landing once the second desired hitting distance is entered, and drawing a circle with the location the camera stands on as the center and with the second desired hitting distance as the radius, determining a second intersection point between the circle and the center line of fairway of the currently selected golf course is the second landing point, and determining the desired hitting direction of the subsequent shot according to GPS data of the current location of the camera and the second landing point.

29. The method of claim 23, further comprising:

recording hit records of every hit of each selected golf course, checking whether or not a history record exists when playing each hit, and prompting the golfer to whether or not to use the history record if the history record exists.

30. The method of claim 29, wherein the step of prompting the golfer to whether or not to use the history record if the history record exists comprises:

prompting the golfer whether or not to use the history record of a previous hitting location as the current setting of the current hitting location if the distance between the previous hitting location and the current hitting location is less than or equal to a preset distance.

31. The method of claim 19, further comprising:

transmitting the recorded video to a portable device communicating with the camera automatically or in response to golfer's operation on the portable device after filming stops.

32. The method of claim 19 further comprising:

controlling the pan-tilt head to drive the camera module to rotate backward to find the golfer and film the golfer's facial expression when the preset time period elapses.

33. The method of claim 19 further comprising.

directing the camera to enter a sleep mode after stopping filming.

* * * * *